United States Patent
Kodialam et al.

(10) Patent No.: US 6,778,531 B1
(45) Date of Patent: Aug. 17, 2004

(54) MULTICAST ROUTING WITH SERVICE-LEVEL GUARANTEES BETWEEN INGRESS EGRESS-POINTS IN A PACKET NETWORK

(75) Inventors: Muralidharan S. Kodialam, Marlboro, NJ (US); Tirnuell V. Lakshman, Eatontown, NJ (US); Sudipta Sengupta, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 641 days.

(21) Appl. No.: 09/677,009

(22) Filed: Sep. 29, 2000

Related U.S. Application Data

(60) Provisional application No. 60/212,418, filed on Jun. 19, 2000, and provisional application No. 60/163,539, filed on Nov. 4, 1999.

(51) Int. Cl.[7] .......................... H04L 12/28; H04L 12/56
(52) U.S. Cl. ...................... 370/390; 370/432; 370/256
(58) Field of Search ................................. 370/390, 392, 370/432, 229, 230, 231, 252, 254, 255, 256, 351, 352, 401, 395.2, 395.21, 408, 356, 400, 235; 709/227, 238, 232

(56) References Cited

U.S. PATENT DOCUMENTS

| | | | | |
|---|---|---|---|---|
| 5,455,956 A | * | 10/1995 | Nguyen et al. | 709/238 |
| 5,630,184 A | * | 5/1997 | Roper et al. | 709/221 |
| 6,088,336 A | * | 7/2000 | Tosey | 370/255 |
| 6,418,139 B1 | * | 7/2002 | Akhtar | 370/356 |
| 6,628,661 B1 | * | 9/2003 | Goldman et al. | 370/408 |

* cited by examiner

*Primary Examiner*—Brian Nguyen

(57) ABSTRACT

A packet network of interconnected nodes employs a method of routing with service-level guarantees to determine a path through the network for a requested multicast, label-switched path Each of the nodes includes one or more routers that forward packets based on a forwarding table constructed from a directed tree determined in accordance with the method of multicast routing with service-level guarantees. For a first implementation, a heuristic algorithm uses a scaling phase that iteratively adjusts a maximum arc capacity, determines the resulting tree for the iteration, and selects the tree as the routing tree that provides the "maximum" flow. For a second implementation, the heuristic algorithm computes maximum multicast flows and determines links in the network that are "critical" to satisfy future multicast routing requests. A multicast routing tree is selected such that provisioning the flows over its links "minimally interferes" with capacity of paths needed for future demands.

17 Claims, 4 Drawing Sheets

MULTICAST ROUTING WITH SERVICE-LEVEL GUARANTEES BETWEEN INGRESS EGRESS-POINTS IN A PACKET NETWORK

CROSS-REFERENCE TO RELATED APPLICATIONS

This application claims the benefit of the filing date of U.S. provisional applications Nos. 60/163,539, filed on Nov. 4, 1999 and 60/212,418, filed on Jun. 19, 2000.

BACKGROUND OF THE INVENTION

1. Field of the Invention

The present invention relates to routing packets in a telecommunications network, and, more particularly, to determining paths through nodes of the network for multicast routing of packets having guaranteed service levels.

2. Description of the Related Art

In interconnected packet networks, such as the Internet, users establish a connection between a source and a destination with a stream of data packets (called a "packet flow" or "flow") transferred through the network over a network path. The network path is defined by a set of nodes interconnected by a set of links. Packet networks may have a hierarchical structure in which smaller networks are interconnected by larger networks, and a peer structure in which equivalent networks are interconnected. A packet network connects to one or more other packet networks through ingress and egress points (routers) of the network.

FIG. 1 shows a network 100 of the prior art having nodes N1–N9 interconnected through links 101 that allow communication between packet networks 102–104. A router of node N1 that transfers packets to the network 100 from a source (packet network 102) is an example of an ingress point, and a router of node N4 that transfers packets from the network 100 to a destination (packet network 104) is an example of an egress point. The network 100 may support an interior routing protocol to distribute network topology information and route packets between ingress and egress points based on best-effort routing (e.g., destination-based shortest-path routing) through the nodes N1–N9. A centralized network management system 105 may be employed to 1) provision virtual circuits, or packet flows, through the network 100; 2) monitor capacity and utilization of links 101; and 3) coordinate calculation and installation of provisioned paths as router forwarding tables. Forwarding tables are used by each node's router to forward each received packet to the next node in the path and toward its destination. In addition, the centralized network management system 105 may collect and distribute network topology information.

Interior routing protocols are employed by network routers to determine a path through the nodes of the network along which packets between a source (ingress) and destination (egress) pair are forwarded. Packets received by a node's router are forwarded to other nodes based on a forwarding table constructed in accordance with the interior routing protocol, but may also be through routes installed with explicit route provisioning. Interior routing protocols may also specify network topology and link-state information ("network topology information") that is exchanged between the network nodes. Network topology information allows the node's router to construct the corresponding forwarding table. An example of a widely used interior routing protocol for "best-effort" routing is the Open Shortest Path First (OSPF) protocol. In addition, some routing protocols associate a link "cost" with each link between nodes. This link cost may be associated with, for example, average link utilization or revenue generated by the link, as well as link "importance" in the network (i.e., how critical the link is to packet routing). When link-state information or link-bandwidth (e.g., connectivity or available bandwidth) is exchanged between routers, each router in the network has a complete description of the network's topology.

Routing protocols, in addition to providing connectivity, may also enable traffic management. The Multi-Protocol Label Switched (MPLS) standard, for example, allows such routing protocols in networks. The MPLS standard may be employed for networks having virtual circuits (packet flows) or label switched paths (LSPs) with provisioned service levels (also known as guaranteed quality-of-service (QoS)).

Provisioned service levels may be, for example, a guaranteed minimum bandwidth for the path of a packet flow through the network. This path having a guaranteed level of service between ingress and egress points may be referred to as a Network Tunnel Path (NTP). As would be apparent to one skilled in the art, specific implementations of NTPs exist for different types of networks. As examples of NTPs, virtual circuits may be established for packet flows in TCP/IP networks, virtual circuits may be established for cells in Asynchronous Transfer Mode (ATM) networks, and label switched paths (LSPs) may be established for packets in MPLS networks. Packets of a signaling protocol, such as RSVP (Reservation Protocol for IP and MPLS networks) with traffic engineering extensions or CR-LDP (Constrained Routing Label Distribution Protocol for MPLS networks), may be used to reserve link bandwidth and establish an NTP. NTPs may be provisioned as an explicit route along specific paths between nodes of the network (i.e., when an NTP is provisioned, all intermediate points may be specified through which a packet passes between the ingress and egress points of the NTP).

In MPLS networks, packets are encapsulated by appending to the packet, or forming from the packet, additional information when the packet is received at an ingress point. The additional information, sometimes referred to as label, is then employed by routers of the network to forward the corresponding packet. In some cases, the label may simply be a pointer that identifies or is otherwise related to specific origination and termination address fields in the header of the received packet.

FIG. 2 shows such an encapsulated packet 200 having a label 201 appended to packet 202. The label summarizes information in the packet header 214 of the original packet 202. The summary may be based on the header field and includes a source address field (s) 210 identifying the address of the ingress point, a destination address field (r) 211 identifying the addresses of the egress point(s). For multicast packets, the destination address field 211 may represent a set $R_s$ of receiver addresses $r_1$ through $r_K$, each of which corresponds to a destination receiving the multicast connection's packets. To distinguish between destinations of a unicast connection (single source and single destination) and those of a multicast connection (single source and multiple destinations), each destination of the multicast connection may be referred to as a "receiver," though operations of a destination and a receiver are generally equivalent.

Label 201 also includes one or more service-level fields 212. Each service-level field 212 may identify a desired service level for the virtual circuit (called a "demand"). In some networks, the values for the service-level fields, such as minimum bandwidth (b), may be implied or derived from the label itself. Other fields 213 may be included in label 201, such as MPLS standard version, interior routing protocol version, maximum delay, or other types of service-level parameters. Label 201 may alternatively be inserted into the packet header (PH) 214 of the packet 202, so the representation of fields shown in FIG. 2 is exemplary only. Networks may employ labels to group encapsulated packets having similar LSPs into classes (equivalence classes), and methods for forwarding equivalence classes may be employed to simplify calculation of NTP routing through the network.

To generate a forwarding table, each router computes a set of preferred paths through the network nodes, and may use weights to calculate the set of preferred paths. Each preferred path has a minimum total weight between nodes as well as minimum summed weight through nodes of the path, which is known in the art as shortest-path routing. This set of preferred paths may be defined with a shortest-path tree (SPT). The forwarding table with routing information (e.g., source-destination pair, source ports, and destination ports) is generated from the SPT. The router uses the routing information to forward a received packet to its destination along the shortest path of the SPT. The SPT may be calculated using an algorithm such as Dijkstra's algorithm, described in E. Dijkstra, "A Note: Two Problems In Connection With Graphs," Numerical Mathematics, vol. 1, 1959, pp. 269–271.

A common shortest-path routing algorithm to generate routing of an LSP is the min-hop algorithm. In the min-hop algorithm, each router calculates a path through the network for the stream of packets (packet flows) between the ingress and egress point. Each router constructs a path for routing the packet flow from the ingress point to the egress point with the least number ("min") of feasible links ("hops") (a feasible link is a link that exists and has sufficient capacity to route the packet flow). Routing schemes of the prior art, such as shortest-path routing, forward packets based only on destination addresses and use only static and traffic-characteristic-independent link weights to calculate paths for routing tables. Some links on the shortest path between certain pairs of ingress and egress points may be congested while other links on alternate paths are under-utilized. A signaling mechanism, such as RSVP or LDP, may be employed to both reserve and establish a connection through the network for a packet flow. The signaling mechanism may specify quality-of-service attributes for the NTP traversing the network.

SUMMARY OF THE INVENTION

In accordance with embodiments of the present invention, data of a multicast connection is routed along paths through a network of nodes interconnected by links from a source to a set of receivers based on a multicast routing tree. The multicast routing tree is generated by 1) forming a subnetwork of the network with nodes and links having available capacity for the multicast connection, and 2) routing the data between the source and each of the multicast receivers through corresponding paths. Routing of the data through the multicast routing tree selects corresponding paths based on a criterion that defers assigning the data to paths with relatively low available capacity or to paths that may be considered critical links. For some embodiments, a heuristic method determines the multicast routing tree by incrementally building a tree from the subnetwork formed by incrementally decreasing capacity of links. For other embodiments, a heuristic method determines the multicast routing tree by weighting the links of the subnetwork, and incrementally building a tree from paths from the source to each of the multicast receivers. The weights for links are determined from critical links in the subnetwork.

In accordance with an exemplary embodiment, data is routed from a source node to a plurality of receiver nodes, the source node and each receiver node included in a network of nodes interconnected by links. The outing is accomplished by (a) forming from the network of nodes and interconnected links, in response to a multi-cast routing request, a subnetwork having paths along which the data may be routed between the source node and the plurality of receiver nodes based on a service level of the routing request; (b) generating at least one tree, each tree comprising a set of nodes and links from the source node and the plurality of receiver nodes, wherein each tree is generated with link weights based on residual capacity of the links in the tree after the data is routed through the tree; (c) selecting a tree as the multicast routing tree, wherein the tree is selected based on a predetermined criteria; and (d) routing the data along the multicast routing tree.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
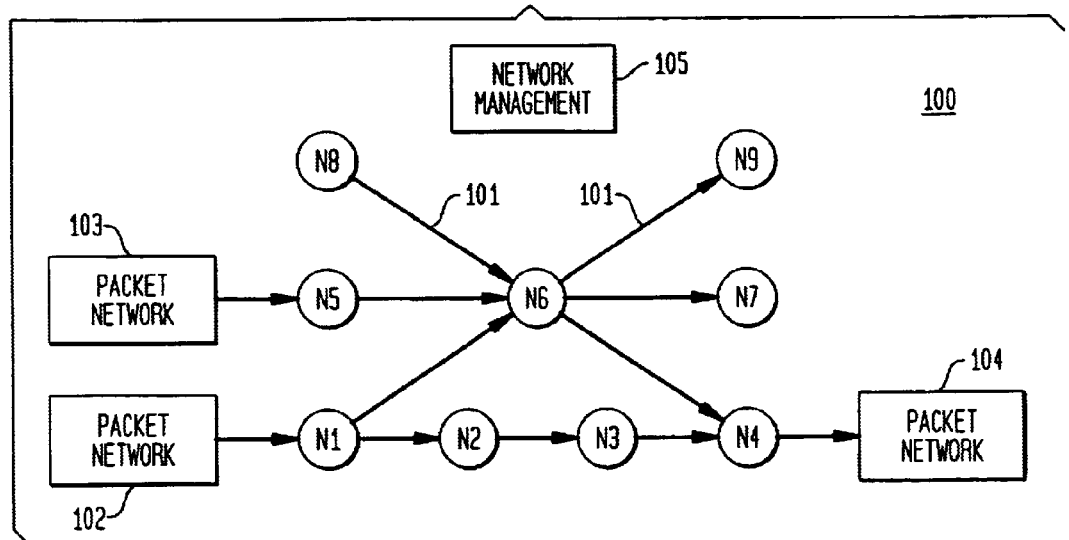
FIG. 1 shows a network of the prior art having nodes interconnected through links that allow communication between lower-level packet networks.
Figure 2:
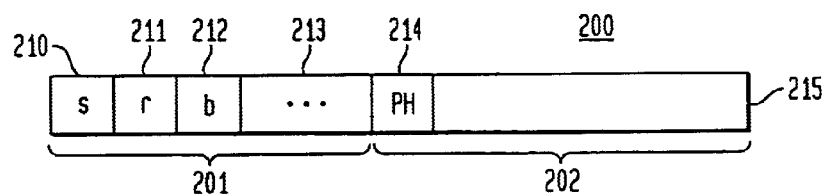
FIG. 2 shows an encapsulated packet employed by the network of FIG. 1 to route packets from an ingress point to an egress point.
Figure 3:
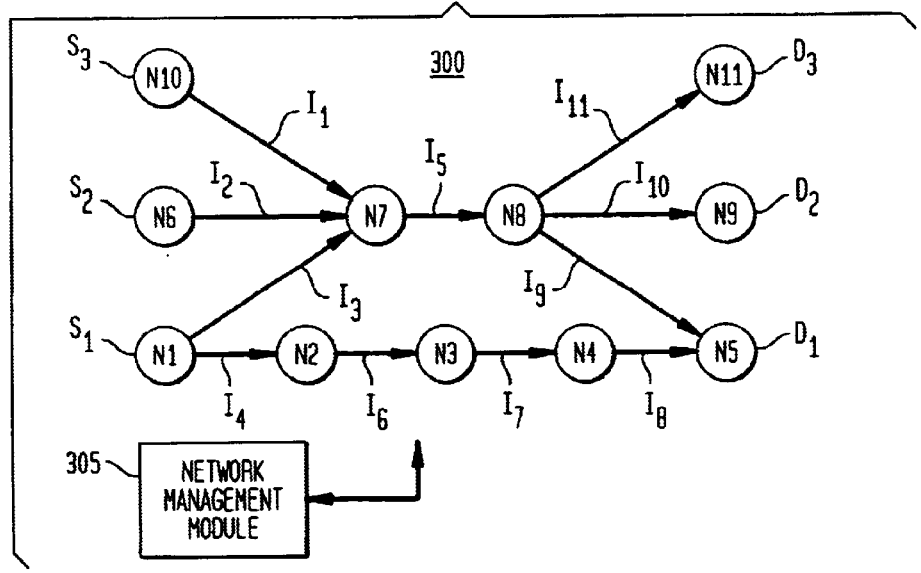
FIG. 3 shows a network of interconnected nodes that employs a method of multipath routing with service-level guarantees in accordance with exemplary embodiments of the present invention.

FIG. 3 shows a network 300 of interconnected nodes N1–N11 employing an exemplary implementation of the multicast routing method with service-level guarantees in accordance with the present invention. Nodes N1–N11 are interconnected via links $l_1$–$l_{11}$. Each link may either be a T1, T3, OC3, or other type of communication link, and is shown as an arrow connecting two nodes in FIG. 3. Two common multicast packet routing applications for may be routing of point-to-multipoint label-switched paths in 1) Multi-Protocol Label Switched (MPLS) networks, and 2) provisioning of Virtual Private Network (VPN) services with bandwidth guarantees. The multicast routing method determines a path through network 300 for a multicast request for a network tunnel path (NTP), such as a label-switched path (LSP in MPLS networks) or virtual circuit (VC in VPN networks).

Each of the nodes N1–N11 includes one or more corresponding routers that forward packets based on a forwarding table of a multicast routing tree constructed in accordance with the multicast routing method described subsequently. Network management module 305 may collect and distribute network topology information of the links $l_1$–$l_{11}$, and, for example, may be include one or more distributed router servers coupled to the routers of nodes N1–N11. Network management module 305 may be employed to generate provisioning, multicast routing trees, forwarding tables, and other connection set-up information that may be downloaded into corresponding routers of nodes N1–N11.

Network management module 305 may either (1) store information of topology of network 300, (2) the network topology information may be administratively received by a request to one or more routers of nodes N1–N11 or (3) from a link-state database accessible to network management module 305 if network 300 employs a link-state routing protocol. In addition, network management module 305 may store, or access a database of initial and currently available capacities of the links $l_1$–$l_{11}$, interconnecting nodes N1–N11. If extensions to routing protocols used in network 300 allow for collection and storage of residual bandwidths for links $l_1$–$l_{11}$, this information may be used directly by network management module 305.

Network management module 305 may also monitor for dedicated failures of one or more links $l_1$–$l_{11}$, (broken, out of service, or dedicated links). Routers in nodes that are ingress or egress points detect failure of connections due to link failure from signaling-protocol information (e.g., LDP or RSVP). In addition to informing the network management module 305 about such link failures, the routers may initiate requests for re-routing of the connections after the link-state database has been updated to reflect the failed links.

While FIG. 3 shows a dedicated network management module 305, this is exemplary only, and is meant to represent a provider for a set of functions, steps, and/or processes that are described herein. One skilled in the art would recognize that the set of functions, steps, and/or processes may be implemented by various processors distributed throughout the network, either in the nodes, in separate processing entities, or both.

Nodes N1, N6, and N10 are defined as ingress points having routers connected to corresponding sources $S_1$, $S_2$, and $S_3$, with these sources generating packets and requests of LSPs and M-LSPs. Although an ingress point and a corresponding source generally refer to different functions, these terms may be employed interchangeably within the following description to refer to the same point at the edge of a network that "begins" a path through the network. Similarly, nodes N5, N9, and N11 are defined as egress points having routers connected to corresponding destinations (also termed receivers) $D_1$, $D_2$, and $D_3$, with these destinations receiving packets of LSPs and M-LSPs. Although an egress point and a corresponding destination generally refer to different functions, these terms may be employed interchangeably within the following description to refer to the same point at the edge of a network that "ends" a path through the network.

While the exemplary embodiments of the present invention are described herein for networks employing the MPLS standard with path requests with associated service levels, such as LSP requests, the present invention is not so limited. The present invention may be employed where multicast requests are received for Network Tunnel Paths (NTPs) having a guaranteed level of service between ingress and egress points. NTPs may be, for example, virtual circuits for packet flows in TCP/IP networks, and connections of cells in Asynchronous Transfer Mode (ATM) networks. In addition, while the present invention is described for capacity of links and demands for minimum bandwidth (i.e., bandwidth demand of at least b along the path) as the guaranteed level of service, other service-level guarantees, such as minimum packet delay or loss, may be employed. As is known in the art, many different Quality-of-Service (QoS) guarantees, such as delay or loss, may be converted into an "effective" bandwidth value as a service level since they may be related to link capacity and occupied bandwidth.

The following describes exemplary embodiments of the present invention for multicast routing of bandwidth-guaranteed multicast LSPs (M-LSPs) that arrive one-by-one and with no a priori information regarding future requests. Each M-LSP routing request may be a request to provision or otherwise set up a path through network 300 from an ingress point source, such as source $S_1$ at node N1, to multiple (destination) receivers, such as $D_1$ and $D_3$ at nodes N5 and N11, respectively. The M-LSP may be one or more packets that comprise the following information: a source address (or other identifier of the M-LSP origin) s, a set $R_s$ of (destination) receiver addresses (or other identifier(s) of the M-LSP destination(s)), and one or more service guarantees such as, for example, a bandwidth requirement b. A server, or other processor such as network management module 305, processes M-LSP requests one-by-one to generate a multicast routing tree such that routing of the connection for the current request may satisfy (e.g., leave enough capacity for) as many potential future requests (service demands) as possible. Consequently, a forwarding table in each of, for example, nodes N1–N11 is generated from the multicast routing tree that defers loading of service of certain links, as described subsequently.

Returning to FIG. 3, network 300 may in general be defined as having NR routers. One subset of these NR routers may be defined as ingress-egress router pairs between which multicast connections are set-up. Another subset of these NR routers comprises a set of RM receivers that, for any multicast connection defined with an M-LSP request {s, $R_s$, b}, the source s is one of the ingress routers, and $R_s$ are the desired receivers selected from the subset of RM receivers. Therefore, a potential M-LSP may not necessarily be established between every possible ingress-egress point pair, and, in general, from certain given ingress points M-LSPs may be established only with certain, predetermined egress points. Such limitations for establishing connections may satisfy network policy or service-level constraints (such as certain VPN traffic may only originate and exit at certain ingress-egress pairs). However, such information is known a priori, changes relatively infrequently, and is available to the router by a provisioning or administrative mechanism.

Before describing the exemplary implementation of multicast routing in accordance with the present invention, the following describes underlying definitions, network conditions, and predefined quantities that may be helpful to one skilled in the art in understanding the present invention.

Multicast routing may require 1) dynamic network information that changes as connections through the network are established and torn-down, and 2) semi-fixed network topology information (quasi-static network information). Dynamic network information available to the multicast routing algorithm includes capacity c of each link 1, which is the amount of bandwidth or other service level available on a link for new M-LSP requests when routing of existing provisioned LSPs/M-LSPs (i.e., existing network path routing) is accounted for. Capacity of links within the network may be exchanged between routers with, for example, an extension to unicast routing protocols such as QoSPF.

Quasi-static information may be network topology, such as the nodes of the network, the nodes forming ingress/egress points (i.e., the edge nodes of the network), the links interconnecting the nodes of the network, and the total link capacities. Multicast routing of an M-LSP request in accordance with embodiments of the present invention desirably avoids splitting of traffic of an M-LSP because no a priori information may be available to indicate whether splitting the M-LSP request's packet streams has an adverse effect on the underlying data carried in the connection. In addition, algorithms implementing multicast routing desirably perform a reasonably low number of computations so as to be relatively easy to implement. For example, in traffic engineering applications, on-line routing of traffic trunks have connection set-up and tear-down frequencies with timescales on the order of minutes or longer since these trunks carry aggregated traffic. Hence, very fast (millisecond) computation of routes may not be necessary.

Each M-LSP request arrives at a route server that determines the explicit multicast routing tree for the multicast LSP request. The route server may be, for example, embodied within network management module 305 such as shown in FIG. 3. The M-LSP request either arrives directly to the server that controls one or more routers (if the M-LSP is set-up through manual provisioning of routersin the network), or the M-LSP may first arrive at a router at an ingress point. When an ingress point router receives the M-LSP, the ingress point router, in turn, queriesinstructs the route server to generate the explicit multicast routing tree. The calculated multicast routing tree is then communicated back to the ingress router,. which then uses a signaling mechanism such as RSVP or LDP (with possible multicast extensions) to set-up the paths through nodes and links to the egress routers (receivers). Such signaling mechanism may also be used to reserve bandwidth on each link for the paths.

Having described the underlying definitions, network conditions, and predefined quantities, the multicast routing algorithm may now be described. An M-LSP request arrives at the router of the ingress point, and the request is defined by a triple $\{s, R_s, b\}$. As described previously, the first field s specifies the source of the multicast connection, the second field $R_s$ specifies the set of receivers, and the third field b specifies the minimum amount of bandwidth (or effective bandwidth) demanded for the connection paths of the M-LSP request.

Routing for a given M-LSP request with source s and set $R_s$ of receivers through network 300, for example, may be modeled as a Steiner tree problem (referred to herein as a multicast tree problem), as subsequently described. Steiner tree problems and numerical techniques for their solution for unicast connections are well known in the art. Solving the Steiner tree problem generates a multicast routing tree that defines the paths for routing flows of the M-LSP request. The current state of network 300 is modeled as a graph G=(N, A) where N is the set of graph G's nodes (e.g., G's nodes $n_1$ though $n_{11}$ corresponding to network nodes N1–N11), and A is the set of graph G's arcs (e.g., the links $l_1$–$l_{11}$ of network 300 that connect nodes N1–N11). Each arc (link) $a_{ij}$ between nodes $n_i$ and $n_j$ has a total capacity, or weighted capacity, $c_{ij}$. However, the graph G=(N, A) might not include all links and nodes of the network, but might rather only include those nodes connected by links having sufficient residual capacity to support the requested connection.

When network 300 has directed links and corresponding bandwidths, the model used is a directed version of the Steiner tree problem. For the directed version of the Steiner tree problem, graph G is a directed graph and the objective is to find the minimum-cost tree (also known as an arborescence). The minimum-cost tree is rooted at the node s (e.g., the node corresponding to source s in the M-LSP request) and spans all the nodes in the set $R_s$ of receivers (i.e., source s should have a path to every receiver in $R_s$). The set of receivers corresponds to the set $R_s$ of receivers in the M-LSP request. A multicast flow is identified with a collection of directed trees $\{T_1, T_2, T_3, \ldots, T_p\}$ rooted at s, reaching all nodes in $R_s$, and with associated flows $X=\{x_1, x_2, x_3, \ldots, xp\}$ obeying the following capacity constraints given in equation (1):

$$\sum_{1 \le k \le f} f(a_{ij}, T_k) x_k \le c_{ij} \forall (a_{ij}) \in A \qquad (1)$$

where $$f(a_{ij}, T_k) = \begin{cases} 1 & \text{if arc } a_{ij} \text{ appears in tree } T^k \\ 0 & \text{otherwise} \end{cases}$$

Each collection of directed trees $\{T_1, T_2, T_3, \ldots, T_p\}$ rooted at s is a potential solution to the multicast Steiner tree problem. A multicast flow subject to equation (1) reduces to a single "unicast" flow from source s to a single receiver (i.e., a single packet flow through the network between an ingress-egress point pair).

As shown in equation (1), the multicast flows $\{x_1, x_2, x_3, \ldots, xp\}$ do not obey the flow conservation property that the total flow entering any node through incoming arcs is equal to the total flow leaving that node through outgoing arcs. A multicast flow might not obey this property because a flow of packets entering an internal node through the incoming arc in the tree can manifest itself as a flow of packets coming out on multiple outgoing arcs in the tree. A source or internal node sending packets to multiple receivers through a multicast tree uses packet replication at internal nodes of the multicast tree that may be included in multiple receiver paths. Consequently, a single packet entering a node in a tree is replicated so it is provided at each of the multiple outgoing arcs in the tree from that node.

For a unicast flow, the maximum unicast flow solution selects a source-destination path that leads to the maximum total flow, given arc (link) capacity constraints and a set of single, directed paths between an ingress-egress point (source-destination) pair. In contrast, the multicast flow is a set of directed trees each rooted at the source and reaching all the receivers. Thus, the maximum multicast flow may be defined as the directed source-receivers tree that maximizes the sum of the flows on all the possible multicast routing trees selected under the given arc capacity constraints.

In a first exemplary implementation of the present invention, a heuristic solution for the maximum multicast flow problem uses a scaling phase that iteratively adjusts a maximum arc capacity and determines the resulting tree for the iteration. The method then selects as the maximum multicast routing tree the resulting tree that provides the "maximum" flow. The maximum flow for this case is a heuristic estimate. This heuristic method of generating a routing tree in response to an M-LSP request, termed the Max-Multicast-Flow (MMF) method, is described with respect to FIG. 4.

At step 401, the method receives as input the network topology as a directed graph G=(N, A) with arc (link) capacities $c_{ij}$. Each arc capacity $c_{ij}$ is the remaining, or residual, capacity of arc aij in A. At step 402, maximum arc capacity U, a capacity scaling value $\Delta$, and tree TR are initialized. The maximum arc capacity U is initialized to the maximum value of arc capacity $c_{ij}$ in the network, the scaling value $\Delta$ is initialized to the lowest integer power of 2 greater than or equal to the maximum arc capacity U, and the tree TR is initialized to the null set.

From step 402, the method begins an iterative loop comprising steps 403–409. The iterative process is termed the $\Delta$-scaling phase of the method and continues until $\Delta$ drops below a threshold of, for example, 1.

At step 403, a graph $G(\Delta)$ (i.e., subnetwork) is formed with nodes from graph G(N, A) that are interconnected by arcs having sufficient residual capacity of at least $\Delta/2$ (residual capacity is the capacity of the link reduced by after the additional (packet) flow assigned to the link). For the first iteration, step 403 forms the graph $G(\Delta)$ that may be substantially equal to the graph G(N,A), and for subsequent iterations, step 403 forms a graph $G(\Delta)$ with nodes interconnected by arcs having sufficient residual capacity of at least half of the residual capacity used to form the subnetwork of the previous iteration.

At step 404, the existence of one or more directed trees in the graph $G(\Delta)$ is determined, and if no directed tree exists for the graph $G(\Delta)$, then the method proceeds to step 410 to provide either 1) the null set for the first iteration, or 2) the tree TR of the previous iteration as the maximum capacity directed tree. If, in step 404, one or more directed trees are determined to exist, then the method proceeds to step 405. At step 405, each directed tree in the graph $G(\Delta)$ is calculated (using, for example, a Breadth First search or Dijkstra's algorithm), and each directed tree is examined to determine the maximum capacity directed tree to support the capacity of flows in X. At step 406, the tree TR is set to the directed tree having the maximum capacity, and the flows in X for the maximum capacity directed tree are assigned to the corresponding arcs in $G(\Delta)$. At step 407, the residual capacities for the arcs in $G(\Delta)$ are updated to account for the decrease in capacity of corresponding arcs assigned the flows in X. At step 408, the scaling value $\Delta$ is set to one half $\Delta$, and, at step 409, a test determines whether the scaling value is less than 1.

If the test of step 409 determines that the scaling value is 1 or more, the method returns to step 403. If the test of step 409 determines that the scaling value is less than 1, the method proceeds to step 410, which provides the current maximum capacity directed tree in $G(\Delta)$ as the output tree TR (e.g., the tree from which a provisioning table may be generated and loaded into nodes N1–N11 of FIG. 3). At step 411, the link weights are generated from the output tree TR. One skilled in the art would recognize that the threshold may be varied depending on actual network capacities and link costs.

Figure 4:
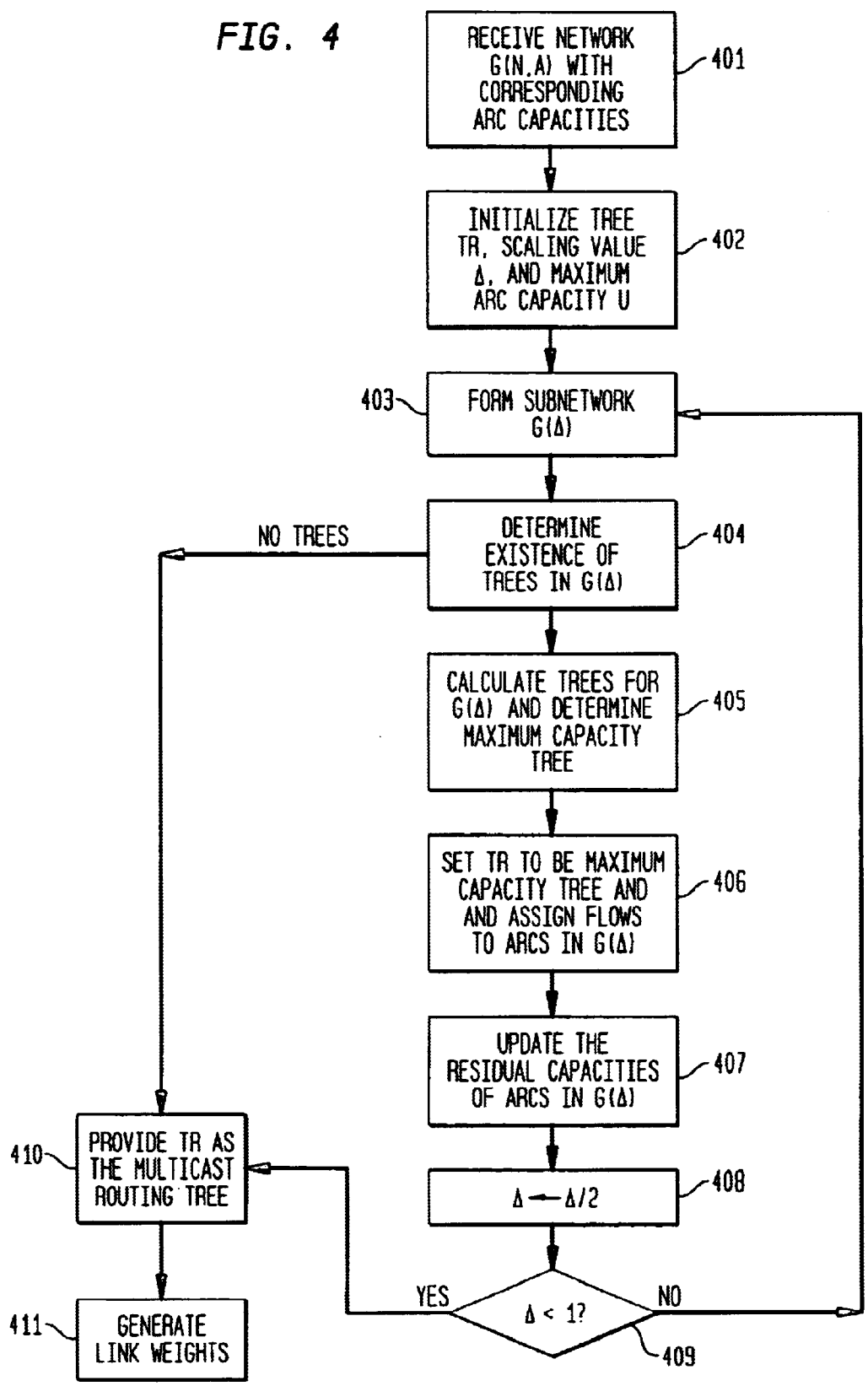
FIG. 4 shows a flowchart of a Max-Multicast-Flow (MMF) method generating a multicast routing tree in response to an M-LSP request in accordance with a first exemplary implementation of the present invention.

The MMF method of FIG. 4 may be implemented with the following pseudo-code:

100 Input: A directed graph G=(N, A) with arc capacities $c_{ij}$
101 a source node s $\in$ N, and a set $R_s \subseteq N-\{s\}$ of receiver nodes.
102
103 Output: A multicast flow tree TR for the maximum multicast flow from s to $R_s$.
104 Method:
105 U←max $c_{ij}$; (i,j)$\in$E
106 $\Delta \leftarrow 2^{\lceil \log_2 U \rceil}$
107 TR←{$\emptyset$}
108 while $\Delta \geq 1$ do
109 $G(\Delta)$←(subgraph of G in which each arc has residual capacity greater than $\Delta/2$);
110 while (there is a directed tree in $G(\Delta)$ from s to $R_s$)
111 Find the maximum capacity directed tree $TR_{max}$
112 from s to $R_s$ in $G(\Delta)$ with capacity X;
113 TR←$TR_{max}$ and Send X units of flow along the tree;
114 Update residual capacities and $G(\Delta)$;
115 endwhile
116 $\Delta \leftarrow \Delta/2$;
117 endwhile
118 return the multicast flow tree TR sent from s to $R_s$;

The maximum capacity directed tree of step 405 may be computed using a binary search on the arc capacities of each tree in the interval $(\Delta/2, \Delta]$. Defining m as the number of arcs in $G(\Delta)$ and n as the number of nodes in N (i.e., m=|A| and n=|N|), the existence of one or more directed trees with capacity to support X from s to $R_s$ in $G(\Delta)$ may be determined by a processor in O(m) time (O(•) being mathematically defined as "on the order of •" time and may be, e.g., processing cycles) using a breadth-first-search (BFS) technique on each arc $a_{ij}$ having capacity greater than or equal to $x_{ij}$. Using BFS techniques for each of the directed trees to find the maximum capacity directed tree, therefore, may be determined by the processor in O(m logU) time. Steps 404 through 408 may be executed at most 2m times during a single $\Delta$-scaling phase. This implies that the running time of a $\Delta$-scaling phase (each iteration of the loop) is O($m^2$ log U).

Returning to network 300 of FIG. 3 using min-hop routing of the prior art, the path calculated for a unicast LSP request between $S_1$ and $D_1$, with bandwidth demand of 1 unit would be through nodes N1 to N7 to N8 to N5 (lowest number of hops is 3, with a total link cost of 3 assuming that each link has an associated weight and/or link cost of 1). Min-hop routing of packets between $S_1$ and $D_1$ along this path through nodes N1 to N7 to N8 to N5 for the requested LSP removes link capacity available to LSPs currently routed along other paths such as between $S_2$, and $D_2$ as well as between $S_3$ and $D_3$. This example illustrates that an alternative path, such as the path through nodes N1 to N2 to N3 to N4 to N5 may be preferred, even though this alternative path has more hops, since this path does not cause interference with future LSPs of other source-destination pairs routed through nodes N7 and N8. The path through nodes N1 to N7 to N8 to N5 contains three links (i.e., arcs $1_3=a_{17}$, arc $1_5=a_{78}$, and $1_9=a_{85}$) one or more of which may be considered "critical" to routing.

In a second exemplary implementation of the present invention, a method of solving for the maximum multicast flow problem iteratively computes critical links and determines the resulting tree for the iteration. The method then selects the tree as the multicast routing tree that provides the "maximum" flow while taking into account these critical links. Before describing the concept of critical links for multicast flows for M-LSPs, the following introduces the concept for critical links for unicast flows.

Referring to FIG. 3, for each possible unicast flow (e.g., a unicast LSP request) a maximum flow (maxflow) value $v_{ij}$ exists between a given ingress-egress point pair $(S_i, D_j)$ that is an upper bound on the total amount of bandwidth that may be routed between that ingress-egress point pair $(S_i, D)$. Such computation of maxflow may be by any of various algorithms known in the art. For example, a discussion of maxflow, or maximum flow, calculation is given in Ahuja, Magnanti, and Orlin, *Network Flows: Theory, Algorithms, and Applications*, Prentice-Hall, 1993, Chapter 7. For flows over a given path, maxflow value v decreases by UB units whenever a bandwidth demand of b=UB units is routed between $S_1$ and $D_1$. The value of $v_i$ also decreases when a unicast flow is routed between some other ingress-egress pair. The amount of interference on a particular ingress-egress pair, say ($S_1$, $D_1$), due to routing an LSP between some other ingress-egress pair is defined for the unicast flow as the decrease in the value of v.

Solving the maximum unicast flow problem may be by computing a directed tree (path) for which routing of the corresponding flows X affects critical links as little as possible. Such method may weight each of the arcs (links) and, for example, set the weight of an arc equal to the number of source-destination pairs for which the link is critical. With these weighted arcs, the demand of the unicast flow between an ingress-egress point pair ($S_i$, D) is routed on the shortest (weighted) path. The critical links for unicast flow may then be determined using a maxflow computation. After the maxflow computation, the arcs that belong in a minimum cut, are set as the critical links for a given ingress-egress point pair ($S_i$, D).

For the example of the unicast (i.e., a unicast LSP request) case, the residual capacities are used to generate a pseudo network containing the set of links and the set of nodes that may support the demand b of the unicast flow request (i.e., a request defined with the triple $\{S_m, R_s=D_n, b\}$. The pseudo network is formed with the same nodes and links as in the network but with link capacities initially set to the current value for residual link capacity (i.e., the link's capacity minus the capacity for existing flows through the link). Maxflow values are computed and the capacity of each link in the pseudo network is then set as the difference between the current residual capacity and the maxflow value over the path containing the link. This capacity may be termed the link's pseudo capacity.

The pseudo network is examined to find the links in a minimum cut that are critical links. The set AC is defined as the set of nodes reachable from the node corresponding to the ingress point (of the source $S_m$). The set BC is defined as the set of nodes that may reach the node corresponding to the egress point. For sets AC and BC, the terms "reachable" and "reach" refer to the existence of a directed path between the nodes that supports demand b. The set of critical links ($C_p$) is determined by adding a link $l_{ij}$ to the set $C_p$ if: 1) the pseudo-capacity of link $l_{ij}$ is zero; 2) node $n_j$ is not in $A_c$; 3) node $n_i$ is not in $B_B$; or 4) there is no path from $n_i$ to $n_j$ in the pseudo network. When all links of the pseudo network have been examined, the set $C_p$ is provided as the set of critical links.

For multicast flows in a network represented as a directed graph G=(N, A), an arc is a "critical link" with respect to a source s and set $R_s$ of receivers if reducing the capacity of the arc by a unit reduces the maximum multicast flow from s to $R_s$. An arc is not a "critical link" if it has a positive residual capacity after the maximum multicast flow is computed. For these critical links, whenever a flow of X (an M-LSP connection) is routed over those links, the maxflow values of one or more ingress-egress point (source-receiver) pairs in (s,$R_s$) decreases. The multicast critical links are computed from the ingress point (source) to all receivers (allowed egress points or destinations) in $R_s$ that form part of the multicast tree from the source.

As is known in the art, many different optimization goals may be employed for an algorithm to construct a "good" tree. For example, one optimization goal is to generate a directed tree providing the minimum delay from source to receivers along the tree, which is an important optimization goal for delay-sensitive multimedia applications, such as real-time teleconferencing. Another optimization goal is to generate a directed tree providing the minimum "cost," which is important to network service providers managing network resources such as bandwidth. The tree's cost is defined as the total cost of the links of the tree. For the following described implementation, minimum cost multicast tree computation is described, but one skilled in the art would recognize that the present invention is not limited to such optimization goal and many different optimization goals may be employed.

Once the multicast critical links are identified, the multicast routing method desirably avoids routing new M-LSPs on the identified critical links to the greatest extent possible. Also, the multicast tree selection is modeled as a directed multicast tree problem by generating a weighted graph $G_w$ representing the original network in which the critical links have weights that are an increasing function of their relative importance, or "criticality," to the network. An increasing weight function is selected that defers loading of critical links.

For the second exemplary implementation described herein, two different methods of setting link weights may be employed. In the first method, critical links for each possible source-destination pair are determined using the method of computing critical links for the unicast case described above. The weight of a link used for solving the multicast routing tree problem is then set to the number of source-destination pairs for which the link is critical. Generating these weights for links that are based on "unicast" critical links (i.e., sets of source-receiver pairs) to provide a multicast routing tree is similar to techniques used for unicast routing tree derived with the minimum interference routing algorithm (MIRA). MIRA is described in U.S. patent application Ser. No. 09/366,620 entitled "Routing With Service Level Guarantees Between Ingress-Egress Points In a Packet Network," filed on Aug. 8, 1999 by the inventors herein whose teachings are incorporated herein by reference.

In the second method of selecting link weights, "multicast" critical links are detennined and the weight of each link is defined to be the number of source-receiver pairs for which the link is included in the multicast critical-link set. A source and a probabilistic selection of a set of receivers are employed for computation of these multicast critical links.

For many implementations, the number of possible receiver subsets is exponential in the size of $R_s$. To reduce the time complexity of the computation, the second method selects a subset $R_s$ of the receivers (egress nodes) for each possible source (ingress node) s using a priori determined probabilistic selection criteria. This probabilistic selection criteria may, for example, use the distribution of past M-LSP request patterns to predict the receivers in $R_s$ for the next request when the source is given. Referring to FIG. 3, the network management module may maintain a database of the following information: 1) number of requests with source s (NR(s)); 2) number of requests with source s and r∈$R_s$ as one of the receivers (NR(s,r)); and 3) total number of receivers over all requests with source s (NT(s)).

For the multicast critical-link computation corresponding to source s, the egress node r is selected with probability p(s,r) given in equation (2)

$$p(s,r)=NR(s,r)/NR(s) \qquad (2)$$

where p(s, r) is the probability that the next M-LSP request will have node r as a receiver given that the source is s. The expected number of receivers chosen for source s is NT(s)/NR(s), which is the average size of the receiver group with source s over all past demand requests. The cost of an arc for the directed (Steiner) tree computation is the number of source-receivers pairs for which the arc is determined to be a critical arc.

Figure 5:
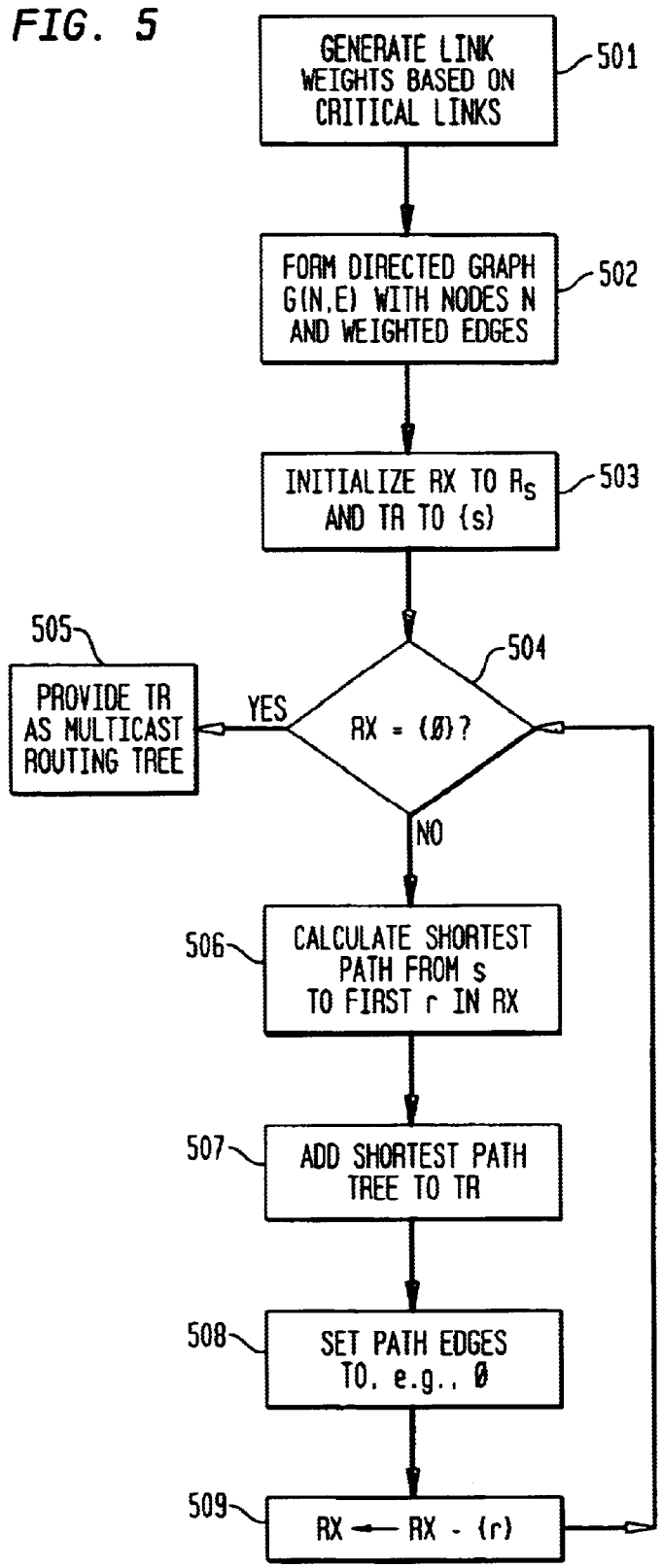
FIG. 5 shows a flowchart of a Nearest Node First (MMF) method generating a multicast routing tree in response to an M-LSP request in accordance with a second exemplary implementation of the present invention.

Using weights for each link generated with either of the two methods, a weighted, directed multicast (Steiner) tree is computed for the network based on the routing of the M-LSP demand from the source s to all the receivers in $R_s$. The calculation of the directed multicast routing tree (e.g., a directed Steiner tree calculation) employing weights for links that, based on these multicast critical links, may be generated by employing a heuristic method. The heuristic method is termed the Nearest Node First (NNF) algorithm, and employs the well-known shortest-path (Dijkstra) algorithm which generates a shortest-path tree by selecting network nodes in order of increasing distances from the source. The NNF algorithm in accordance with the second exemplary embodiment of the present invention is shown in FIG. 5.

At step 501, weights are generated for the corresponding network links based on the received M-LSP request $\{s, R_s, b\}$. Weights may be calculated by generating critical links for either the "unicast" critical links case (a set $R_{cl}$ of i source-receiver pairs $\{s, r_i \epsilon R_{cl} = R_s\}$ where i is the number of receivers in $R_s$) or the "multicast" critical links case (a source and a probabilistic selection of a set $R_{cl}$ of receivers $\{s, R_{cl} \subseteq R_s\}$). In addition, the weights may be generated from the tree generated by, for example, the heuristic method of FIG. 4.

At step 502, the method receives as input the directed weighted graph $G_W(N,E)$ and the request $\{s, R_s, b\}$. For the directed weighted graph $G_W,N,E)$, N is a set of nodes corresponding to the network nodes and E is a set of weighted edges formed from the nodes and links of the network having sufficient capacity to support the flows of the request $\{s, R_s, b\}$. Here, the term "edge" corresponding to the link between network router nodes is meant to distinguish from the first exemplary embodiment term "arcs." Each edge is weighted based on the weights calculated in step 501. For shortest-path computation, an edge $e_{ij}$ connects nodes $n_i$ and $n_j$, and each edge has a corresponding weight, or cost, that may be thought of as a "distance" between the nodes $n_i$ and $n_j$.

At step 503, the method sets a "dummy" set RX to be the set $R_s$ and initializes the multicast tree TR to include the source node s. At step 504, the method tests whether the dummy set RX is empty. If the dummy set RX is empty then the method proceeds to step 505 at which the multicast tree TR is provided as the output multicast tree. Otherwise, if the dummy set RX is not empty, the method proceeds to step 506.

At step 506, a shortest-path (e.g., Dijkstra) algorithm computes the shortest path from source node s to a first-reached destination node $r_i \epsilon$ RX based on the shortest distance (cumulative weighted edges) of all possible paths between s and $R_i$. At step 507, the path computed in step 506 comprising the i) nodes and ii) edges (i.e., links) between the nodes is added to the multicast (Steiner) tree TR. At step 508, the weight of each edge for the path computed in step 506 is set to zero. The weights for edges are included path may be set to zero for two reasons. First, since these edges have already been added to the tree TR, the incremental cost of using these edges to reach other nodes is zero. Second, setting these edge weights to zero encourages future iterations running a shortest-path algorithm to use these edges, and increased sharing of paths to two different receivers tends to generate trees having lower total cost.

At step 509, the dummy" set RX is set to RX-$\{r_i\}$, and after step 509 the method returns to step 504. Thus, the method iteratively computes the shortest paths for all the receivers in $R_s$.

The following pseudo-code may be employed to implement the second exemplary implementation of the NNF algorithm shown in FIG. 5.
100 Input: A directed graph $G_w$=(N, E) with a set of edge costs associated with E,
101 a source node s, and a set $R_s$ of receiver nodes.
102 Output: A low-cost directed Steiner tree TR rooted
103 at s spanning all the nodes in $R_s$.
104 Method:
105 RX←$R_s$; TR←$\{\emptyset\}$
106 while RX≠∅ do
107 Run Dijkstra's shortest-path algorithm with
108 source s until a node $r_i \epsilon$ RX is reached;
109 Add the path from s to r; to the Steiner
110 tree TR built so far;
111 Set the costs of all the edges along this
112 path to zero;
113 RX←RX-$\{r_i\}$;
114 endwhile The NNF method shown in FIG. 5 may be extended to the case of a set $\overline{R}$ of receivers that either want to join or leave the set $R_s$ of receivers of the M-LSP request (i.e., either modifying the M-LSP to include more or fewer egress points from the source (ingress) point).

When a set $\overline{R}$ of receivers joins a multicast tree TR, the NNF algorithm such as described with respect to FIG. 5 is re-applied with the tree TR initialized to be the current multicast routing tree, but with the costs of all the edges in the tree TR set to zero and the set RX of receivers initialized to $\overline{R}$. The costs of the corresponding edges that are not in the tree TR may also be re-computed before re-applying the algorithm because many edge costs may have changed. The edge costs may have changed as a result of multicast bandwidth allocations (i.e., routing of new LSP and M-LSP requests in the network) since the tree TR was first computed, and hence the critical links may also have changed. When a set $\overline{R}$ of current receivers leaves a multicast tree TR, the edges and nodes that are not contained in a path from the source to any of the remaining receivers of the tree TR are removed ("pruned") and the available bandwidth for the pruned edges is updated ("released").

Figure 6:
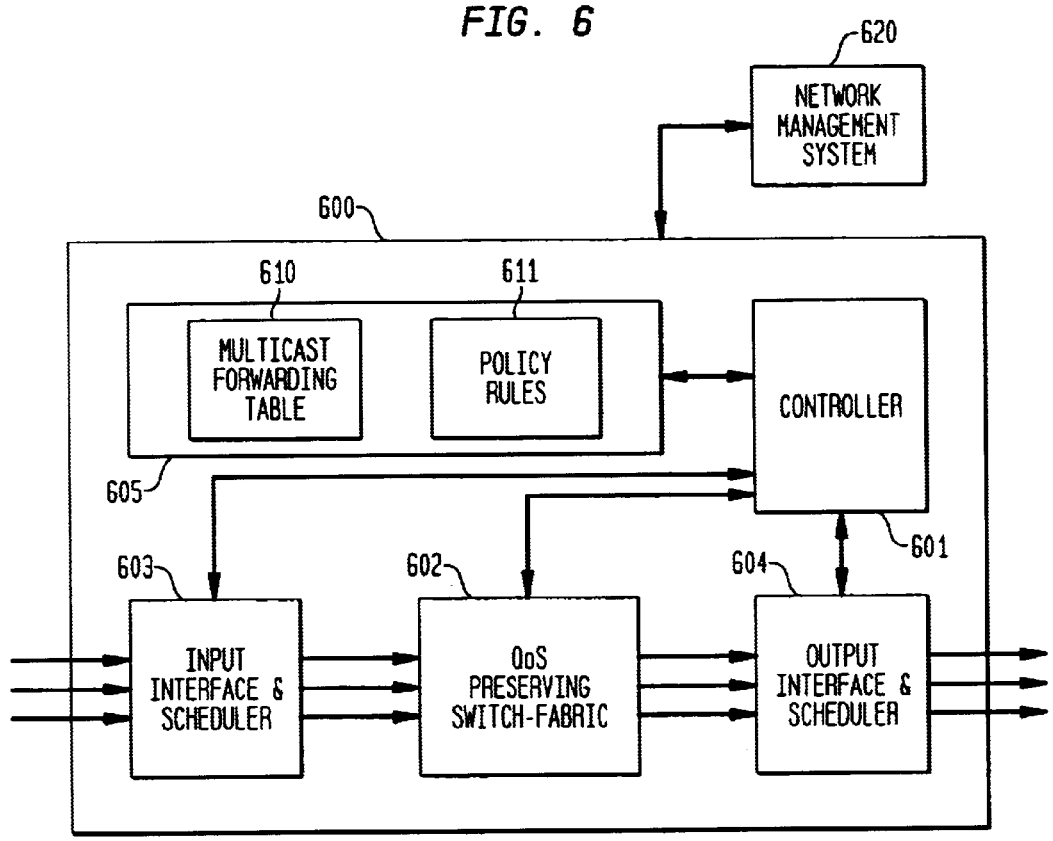
FIG. 6 shows an exemplary processing section of a router implementing a multicast routing tree generated by, for example, implementation of either the method of FIG. 4 or FIG. 5.

FIG. 6 shows an exemplary processing section of a router 600 implementing the multicast routing method (i.e., multicast routing with multicast forwarding tables derived from a multicast routing tree generated by, for example, the implementations of the method of FIGS. 4 or 5). At least one instance of the router process selection of FIG. 6 is preferably implemented within each of nodes N1–N11 of FIG. 3. Router 600 includes a controller 601, QoS preserving switch-fabric 602, input interface and scheduler 603, output interface and scheduler 604, and memory 605. QoS preserving switch-fabric 602 allows routing of packets through known or fixed delay, thereby allowing the network to account for the delay to maintain QoS levels. The input interface and scheduler 603 and output interface and scheduler 604 each include queues and service scheduling to maintain QoS levels. Memory 605 includes a multicast forwarding table 610 and may also include a set of policy rules 611 for network routing. Controller 601 causes QoS preserving switch-fabric 602 to route packet flows between input interface and scheduler 603 and output interface and scheduler 604 based on labels (for MPLS networks) or source and destination addresses (for IP networks) in accordance with the forwarding table 610. Multicast forwarding table 610 may be constructed by controller 601 using information from a centralized network management system 620 that employs the multicast routing method. Alternatively, forwarding table 610 may be constructed in accordance with the multicast routing method by the controller 601 from network topology information and an NTP request contained in a control packet generated by, for example, network management module 305 (FIG. 3) received at input interface 603.

As would be apparent to one skilled in the art, the various functions of method of routing with service-level guarantees may be implemented with circuit elements or may also be implemented in the digital domain as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of routing data from a source node to a plurality of receiver nodes, the source node and each receiver node included in a network of nodes interconnected by links, comprising the steps of:
   (a) forming from the network of nodes and interconnected links, in response to a multi-cast routing request, a subnetwork having paths along which the data may be routed between the source node and the plurality of receiver nodes based on a service level of the routing request;
   (b) generating at least one tree, each tree comprising a set of nodes and links from the source node and the plurality of receiver nodes, wherein each tree is generated based on residual capacity of the links in the tree after the data is routed through the tree, wherein step (b comprises the steps of:
      (b1) determining a scaling phase based on the residual capacity of the links,
      (b2) generating a tree with the scaling phase, and
      (b3) adjusting the scaling phase to generate an updated scaling phase such that the residual capacity is reduced;
   (c) selecting a tree as a multicast routing tree, wherein the tree is selected based on a predetermined criteria, wherein step (c) comprises the steps of:
      (c1) comparing each updated scaling phase with a threshold, and
      (c2) selecting the tree based on the comparison of step (c1); and
   (d) routing the data along the multicast routing tree.

2. The method of claim 1, wherein:
   step (b1) generates an initial scaling phase for a first tree based on the capacity of the network when the data of the multi-cast routing request is routed along the corresponding links of the network, and generates at least one more tree based on each corresponding updated scaling phase;
   step (b3) iteratively adjusts the scaling phase by applying one or more scaling factors to generate each updated scaling phase.

3. The method of claim 1, further comprising the steps of:
   (e) identifying one or more receivers from an updated routing request either designated to receive data or no-longer designated to receive data;
   (f) updating the network of step (a) based on the one or more receivers identified in step (e) and the corresponding residual capacities.
   (g) repeating steps (b), (c), and (d).

4. The method of claim 1, wherein step (c) comprises the step of generating weights from the selected tree for the links, and step (b) comprises the step of generating a new multicast tree based on the weighted links, and, and step (d) routs the data along the new multicast tree.

5. The method of claim 4, wherein step (d) routs the data along the new multicast tree in accordance with paths generated with either a Dijkstra, shortest path first, or breadth-first search algorithm.

6. A method of routing data from a source node to a plurality of receiver nodes, the source node and each receiver node included in a network of nodes interconnected by links, comprising the steps of:
   (a) forming from the network of nodes and interconnected links, in response to a multi-cast routing request, a subnetwork having paths along which the data may be routed between the source node and the plurality of receiver nodes based on a service level of the routing request, wherein step (a) comprises the steps of:
      (a1) generating a set of critical links;
      (a2) determining a corresponding set of weights from the set of critical links;
      (a3) applying the weights to the links; and
      (a4) generating the subnetwork with weighted links;
   (b) generating at least one tree, each tree comprising a set of nodes and links from the source node and the plurality of receiver nodes, wherein each tree is generated based on residual capacity of the links in the tree after the data is routed through the tree, wherein step (b) comprises the step of:
      (b1) iteratively generating a tree by calculating shortest paths between the source and each receiver, and, for each iteration, adding the path to the tree;
   (c) selecting a tree as a multicast routing tree, wherein the tree is selected based on a predetermined criteria; and
   (d) routing the data along the multicast routing tree.

7. The method of claim 6, wherein step (a1) generates the set of critical links for sets of unicast pairs, each unicast pair defined between the source and one of the plurality of receivers, and then forming each weight of the set of weights based on number of pairs for which corresponding link is included in the set of critical links.

8. The method of claim 6, wherein step (a1) generates the set of critical links for a set of multi-cast pairs in a probabilistic network, each multi-cast pair defined between the source and one of the plurality of receivers, and then forming each weight of the set of weights based on number of pairs for which corresponding link is included in the set of critical links.

9. The method of claim 6, wherein for step (b1), each path for the tree is generated with either a Dijkstra, shortest path first, or breadth-first search algorithm.

10. The method of claim 9, wherein:
wherein for step (b1), each weight of a corresponding link in the path generated for the tree is set to zero after the path is added to the tree.

11. The method of claim 6, further comprising the steps of:
(e) identifying one or more receivers from an updated routing request either designated to receive data or no-longer designated to receive data;
(f) updating the network of step (a) based on the one or more receivers identified in step (e) and the corresponding residual capacities.
(g) repeating steps (b), (c), and (d).

12. Apparatus for routing data from a source node to a plurality of receiver nodes, the source node and each receiver node included in a network of nodes interconnected by links, comprising:
an input module for receiving 1) a request for a path with a service demand for routing data between one of the ingress-egress point pairs of the network; and 2) the data associated with the request;
a processing module for determining the path of the request, wherein the processing module determines the path by:
(a) forming from the network of nodes and interconnected links, in response to a multi-cast routing request, a subnetwork having paths along which the data may be routed between the source node and the plurality of receiver nodes based on a service level of the routing request;
(b) generating at least one tree, each tree comprising a set of nodes and links from the source node and the plurality of receiver nodes, wherein each tree is generated based on residual capacity of the links in the tree after the data is routed through the tree, wherein the tree is generated by:
(b1) determining a scaling phase based on the residual capacity of the links,
(b2) generating a tree with the scaling phase, and
(b3) adjusting the scaling phase to generate an updated scaling phase such that the residual capacity is reduced;
(c) selecting a tree as a multi-cast routing tree, wherein the tree is selected based on a predetermined criteria, wherein the tree is selected by:
(c1) comparing each updated scaling phase with a threshold, and
(c2) selecting the tree based on the comparison of step (c1); and
(d) routing the data along the multi-cast routing tree.

13. A computer-readable medium having stored thereon a plurality of instructions, the plurality of instructions including instructions which, when executed by a processor, cause the processor to implement a method for routing data from a source node to a plurality of receiver nodes, the source node and each receiver node included in a network of nodes interconnected by links, the method comprising the steps of:
(a) forming from the network of nodes and interconnected links, in response to a multi-cast routing request, a subnetwork having paths along which the data may be routed between the source node and the plurality of receiver nodes based on a service level of the routing request;
(b) generating at least one tree, each tree comprising a set of nodes and links from the source node and the plurality of receiver nodes, wherein each tree is generated with link weights based on residual capacity of the links in the tree after the data is routed through the tree, wherein step (b) comprises the steps of:
(b1) determining a scaling phase based on the residual capacity of the links,
(b2) generating a tree with the scaling phase, and
(b3) adjusting the scaling phase to generate an updated scaling phase such that the residual capacity is reduced;
(c) selecting a tree as a multicast routing tree, wherein the tree is selected based on a predetermined criteria, wherein step (c) comprises the steps of:
(c1) comparing each updated scaling phase with a threshold, and
(c2) selecting the tree based on the comparison of step (c1); and
(d) routing the data along the multi-cast routing tree.

14. A router for routing data from a source node to a plurality of receiver nodes, the source node and each receiver node included in a network of nodes interconnected by links, comprising:
a processing module determining a set of paths of a multi-cast routing request based on a multi-cast routing tree, wherein the processing module determines the multi-cast routing tree by:
(1) forming from the network of nodes and interconnected links, in response to the multi-cast routing request, a subnetwork having paths along which the data may be routed between the source node and the plurality of receiver nodes based on a service level of the routing request;
(2) generating at least one tree, each tree comprising a set of nodes and links from the source node and the plurality of receiver nodes, wherein each tree is generated with link weights based on residual capacity of the links in the tree after the data is routed through the tree, wherein the tree is generated by (i) determining a scaling phase based on the residual capacity of the links, (ii) generating a tree with the scaling phase, and (iii) adjusting the scaling phase to generate an updated scaling phase such that the residual capacity is reduced; and
(3) selecting one tree as the multi-cast routing tree, wherein the tree is selected based on a predetermined criteria by comparing each updated scaling phase with a threshold. and selecting the tree based on the comparison; and
a routing fabric routing the data through the router in accordance with the multicast routing tree.

15. Apparatus for routing data from a source node to a plurality of receiver nodes, the source node and each receiver node included in a network of nodes interconnected by links, comprising:
an input module for receiving 1) a request for a path with a service demand for routing data between one of the ingress-egress point pairs of the network; and 2) the data associated with the request;

a processing module for determining the path of the request, wherein the processing module determines the path by:
(1) forming from the network of nodes and interconnected links, in response to a multi-cast routing request, a subnetwork having paths along which the data may be routed between the source node and the plurality of receiver nodes based on a service level of the routing request, wherein the subnetwork is formed by:
  (i) generating a set of critical links;
  (ii) determining a corresponding set of weights from the set of critical links;
  (iii) applying the weights to the links; and
  (iv) generating the subnetwork with weighted links;
(2) generating at least one tree, each tree comprising a set of nodes and links from the source node and the plurality of receiver nodes, wherein each tree is generated based on residual capacity of the links in the tree after the data is routed through the tree, wherein the tree is iteratively generated by calculating shortest paths between the source and each receiver, and, for each iteration, adding the path to the tree;
(3) selecting a tree as a multi-cast routing tree, wherein the tree is selected based on a predetermined criteria; and
(4) routing the data along the multi-cast routing tree.

16. A computer-readable medium having stored thereon a plurality of instructions, the plurality of instructions including instructions which, when executed by a processor, cause the processor to implement a method for routing data from a source node to a plurality of receiver nodes, the source node and each receiver node included in a network of nodes interconnected by links, the method comprising the steps of:
(a) forming from the network of nodes and interconnected links, in response to a multi-cast routing request, a subnetwork having paths along which the data may be routed between the source node and the plurality of receiver nodes based on a service level of the routing request, wherein step (a) comprises the steps of:
  (a1) generating a set of critical links;
  (a2) determining a corresponding set of weights from the set of critical links;
  (a3) applying the weights to the links; and
  (a4) generating the subnetwork with weighted links;
(b) generating at least one tree, each tree comprising a set of nodes and links from the source node and the plurality of receiver nodes, wherein each tree is generated with link weights based on residual capacity of the links in the tree after the data is routed through the tree, wherein step (b) comprises the step of:
  (b1) iteratively generating a tree by calculating shortest paths between the source and each receiver, and, for each iteration, adding the path to the tree;
(c) selecting a tree as a multicast routing tree, wherein the tree is selected based on a predetermined criteria; and
(d) routing the data along the multi-cast routing tree.

17. A router for routing data from a source node to a plurality of receiver nodes, the source node and each receiver node included in a network of nodes interconnected by links, comprising:
a processing module determining a set of paths of a multi-cast routing request based on a multi-cast routing tree, wherein the processing module determines the multi-cast routing tree by:
(1) forming from the network of nodes and interconnected links, in response to the multi-cast routing request, a subnetwork having paths along which the data may be routed between the source node and the plurality of receiver nodes based on a service level of the routing request, wherein the subnetwork is formed by:
  (i) generating a set of critical links;
  (ii) determining a corresponding set of weights from the set of critical links;
  (iii) applying the weights to the links; and
  (iv) generating the subnetwork with weighted links;
(2) generating at least one tree, each tree comprising a set of nodes and links from the source node and the plurality of receiver nodes, wherein each tree is generated with link weights based on residual capacity of the links in the tree after the data is routed through the tree, wherein the tree is iteratively generated by calculating shortest paths between the source and each receiver, and, for each iteration, adding the path to the tree; and
(3) selecting one tree as the multi-cast routing tree, wherein the tree is selected based on a predetermined criteria; and
a routing fabric routing the data through the router in accordance with the multicast routing tree.

* * * * *